Figure 1:
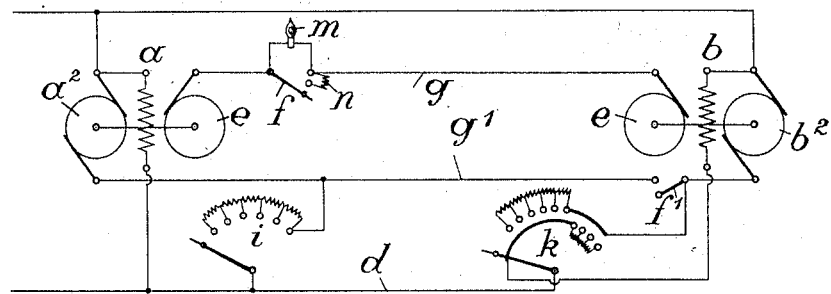

F. E. THORMEYER.
DEVICE FOR CONTROLLING THE SYNCHRONISM OF TWO MOTORS.
APPLICATION FILED APR. 12, 1911.

Patented Jan. 2, 1912.

Witnesses.

Inventor.
Franz Ewald Thormeyer,

UNITED STATES PATENT OFFICE.

FRANZ EWALD THORMEYER, OF HAMBURG, GERMANY.

DEVICE FOR CONTROLLING THE SYNCHRONISM OF TWO MOTORS.

1,013,331.  Specification of Letters Patent.  Patented Jan. 2, 1912.

Application filed April 12, 1911. Serial No. 620,678.

*To all whom it may concern:*

Be it known that I, FRANZ EWALD THORMEYER, a citizen and resident of Hamburg, in the German Empire, have invented a new and useful Device for Controlling the Synchronism of Two Motors, of which the following is a specification.

In my prior Patent No. 989,207, dated April 11, 1911, I have described a device for controlling the synchronous operation of two reproducing apparatus such as a kinematograph and a phonograph, in which speed regulating means and a releasable connection between driving mechanisms are made use of by the aid of which the two apparatus are made to run synchronously as a rule and when any disturbance arises one or the other may be regulated with regard to its speed. When electric motors are employed it is advisable to use electric means to positively connect the motors and to regulate the latter by electric means as well. This is done according to the present invention in such manner, that the windings of the armatures are connected by a special conductor, so as to insure synchronous working of the motors, since by way of this conductor current passes from one motor to the other as soon as one motor has the tendency to run faster than the other. To enable one motor to be regulated independent from the other, whenever any disturbance arises the said connecting conductor is provided with a contact breaker and in the feed conductor a resistance is arranged, in such manner that either in the supply conductor for the armature or in that for the field-magnet of the motor resistances may be switched in. For this purpose a regulating resistance my be employed in such manner that it can be used as starting switch for both motors and when the armatures of the motors are supplied with current separately it can be used as regulating device for the armature of the second motor. In the example shown in the drawing it is assumed, that the motor shown on the left runs at a constant speed, while the other can be regulated, so that it may be allowed to run faster or slower than the other at will.

By the term "positively connected" employed in the following description, I mean connected by a good conductor.

Figure 2:
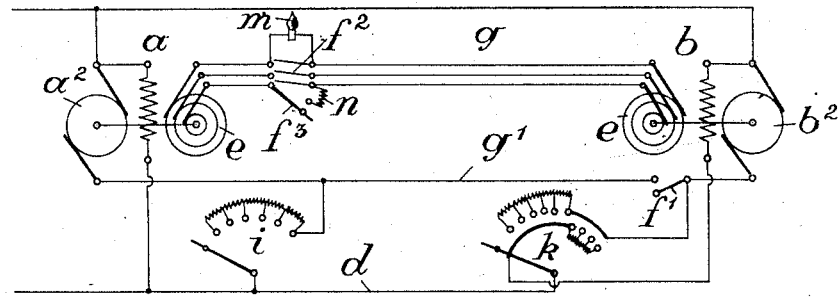
Figure 3:
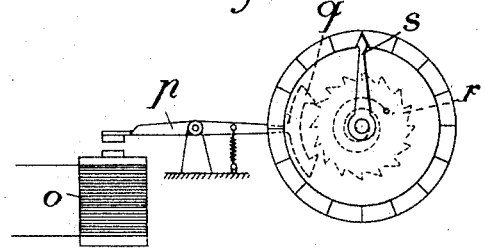

Figure 1 of the drawings is a diagrammatic view of a plant to carry this invention into effect, in which the field magnets of the motors are constantly connected with the main or supply conductor and Fig. 2 shows a similar view of a modification, in which the armature of one motor is switched off from the main or supply conductor, so that this motor runs as a synchronous motor to the other, which works as a dynamo. Fig. 3 is an elevation of a regulating device.

The motors $a$ and $b$ are provided with the usual collectors $a^2$ and $b^2$ and besides with special slip-rings $e$, which are connected one with the other by means of a conductor $g$, which can be opened and closed by a contact make and break device or switch $f$. The motors which are in parallel connection with the feed conductors or line wires $d$, $d'$ can be operated and regulated separately when the connecting conductor is opened. When the motors are to be started both at the same time so as to make them run synchronously they are electrically and positively connected together by closing the contact breaker $f$ and the armature of the motor $a$ is connected with the starting and regulating resistance $h$ by closing the contact breaker $f^1$ in a lead wire $g^1$. If desired the resistance $i$ may be omitted and replaced by a simple contact make and break device. When the resistance $i$ is used, the lead $g^1$ with its contact breaker $f^1$ may be omitted. In the drawing the line wire $d$ is shown disconnected from the armature of the motor $b$ by the regulating lever of the regulator $k$, but not so the field-magnet. When the motors are started and made to run at the desired speed, the synchronous operation may be interrupted during working, by first taking care that the motor $b$ is supplied through the regulating device $k$ at the same tension as through the resistance $i$, so that the latter may be switched off from the connection by opening the contact breaker $f^1$. Both motors will then continue to run synchronously until the electric connection is interrupted by opening the contact breaker $f$. Now the motor $b$ can be regulated so as to run slower or faster by cutting out or in resistances in the regulator $k$ and can finally be regulated so as to again secure synchronism, whereupon the positive connection of the motors is again brought about by closing the contact breaker $f$.

The operation described in the last paragraph will be better understood if the regulating device $k$ instead of resistance $i$ be used for starting the motors. In so doing, the contact breaker or switch $f^1$ must be closed. When the device $k$ is switched in and the contact breaker $f$ is closed both motors will run synchronously. When it is desired to interrupt this synchronism, and to regulate the motor $b$ independently from motor $a$, care must be taken beforehand to give both motors equal tension. This is done by switching in the resistance device $i$, by moving the lever from the position shown in the drawing, over all the contacts shown. Now the switch $f^1$ is opened so as to cut the device $k$ out of circuit of the motor $a$; nevertheless the motors are bound to run synchronously for reason of the positive connection by the conductor $g$. In order to allow the motors to run independently from one another, the last named positive connection is interrupted by opening the contact breaker $f$, whereupon the motor $b$ can be regulated independently from motor $a$ by aid of the regulating device $k$.

Before the contact breaker $f$ is closed, it is of importance to know, whether at the time synchronism is prevailing and whether no current passes over from one motor to the other by the connecting conductor. For this purpose the space in the conductor $g$, created by opening the contact breaker $f$ is bridged by a wire, in which an incandescent lamp $m$ or any other device for instance a voltmeter or the like is arranged, to allow differences of tension to be recognized or read off; such device however must be so constructed, that it itself requires so little current, that it takes no effect in the running or synchronism of the motors, that is to say, the device must offer a suitably high resistance. When the motors do not run synchronously the lamp will become momentarily incandescent periodically, so that it can be seen whether there is still a difference in the speed of the motors. If for instance in a certain time the lamp has become incandescent five times the armature of one motor has made five revolutions more than the other. When the lamp remains incandescent continuously, without glowing stronger periodically, the motors may run synchronously but the position of the slip rings $e$, that is to say, the position of the points of connection of the windings with the slip ring one with reference to the other then is such that the differences in the tension exist. These differences can be balanced by some suitable means, for instance by a resistance $n$, which preferably is combined with the contact breaker in such manner that in a certain position of the breaker lever this resistance is inserted into the conductor $g$. The action of this resistance takes place momentarily, so that a short movement there and back is sufficient to balance the difference. The resistance also has the object to avoid rushes of current that might cause disturbances to take place when the circuit is closed by the lever $f$. The resistance hereby has the effect to allow the current to pass by degrees. When the lamp extinguishes during the run of the motors they work synchronously and no tension exists between the slip rings. The switch $f$ may then be closed, as has been explained above.

Instead of an incandescent lamp or besides this lamp other electric signals or indicating means may be employed. For instance in Fig. 3 a device is shown, which is well adapted to be used as indicating device, to indicate any difference in the speed of the two motors. This device consists of an electromagnet $o$, the coils of which bridge the opening of the contact breaker $f$ and the rocking armature $p$ of which is connected with an anchor $q$, which is adapted to operate a toothed wheel $r$. On the shaft of this wheel which is acted upon by a spring there is a hand $s$, which points to a circular scale. The number of revolutions, which one motor makes more than the other in a certain period of time can be read off from this indicator. The current required by this indicator of course should also be so small, that, when it is working there is no effect on the speed of one motor or the other. Nevertheless, there is a connection between the two motors which, as will be clearly understood from the foregoing description, is passed by some current and by closing the contact breaker $f$, even if no resistance is present, the conductivity of the conductor $g$ is changed to such extent, that the tension between the motors is changed thereby.

Instead of connecting the armature coils or windings of the motors $a$ and $b$ by one single wire, two or more wires can be employed. In the modification shown in Fig. 2 the connecting conductor consists of three wires, having a combined contact breaker $f^2$, the three arms of which are moved at the same time. The resistance $n$, which may be connected with one of the wires, can be operated by a special arm $f^3$. The signal or the indicator can be brought in connection with one single wire. When in the modification shown in Fig. 2 the motors are running synchronously and when the contact maker $f^2$ is closed the armature of the motor can be switched off from the resistances $i$ and $k$, so that it is supplied merely by way of the connecting conductor by the motor $a$, which then works as dynamo and runs as synchronous motor to it. The regulation of the speed can be carried out in the same manner as described with reference to Fig. 1.

Instead of making use of two motors, three or more can be employed and regulated in the same manner.

I claim:

1. In a device of the character described, the combination with the main conductors, and a plurality of motors in parallel connection therewith, of a connecting conductor between the armature of the motors, means to control the conductivity of said connecting conductor and a resistance between the motors and one of the main conductors adapted to control the speed of one motor independent of the other.

2. In a device of the character described, the combination with the main conductors, and a plurality of motors in parallel connection therewith, of a connecting conductor between the armature of the motors, and means to indicate the number of revolutions which one motor makes more than the other in a certain period of time.

3. In a device of the character described, the combination with the main conductors, and a plurality of motors in parallel connection therewith, of a connecting conductor between the armature of the motors, a contact breaker in the connecting conductor, a signal in the latter adapted to indicate differences of tension and to be short circuited by the contact breaker.

4. In a device of the character described, the combination with the main conductors, and a plurality of motors in parallel connection therewith, of a connecting conductor between the armature of the motors, and a contact breaker in the connection conductor, comprising a circular scale and hand to indicate the number of revolutions which one motor makes more than the other in a certain period of time.

5. In a device of the character described, the combination with the main conductors, and a plurality of motors in parallel connection therewith, of a connecting conductor between the armature of the motors, a contact breaker in the connecting conductor, and a resistance in the latter adapted to be switched in or out.

FRANZ EWALD THORMEYER.

Witnesses:
F. A. MAX KAEMPFF,
ERNEST H. L. MUMMENHOFF.